United States Patent [19]

Barbee, Jr.

[11] 4,142,798
[45] Mar. 6, 1979

[54] PLATFORM LASER BEAM GENERATOR SUPPORT AND ALIGNMENT APPARATUS AND METHOD FOR USING SAME

[76] Inventor: Adron W. Barbee, Jr., 2140 Hulman, Terre Haute, Ind. 47803

[21] Appl. No.: 842,226

[22] Filed: Oct. 14, 1977

[51] Int. Cl.² .............................................. G01C 9/18
[52] U.S. Cl. ...................................... 356/138; 33/1 H; 33/286; 356/399
[58] Field of Search ................. 356/138, 172; 33/1 H, 33/286, DIG. 21

[56] References Cited

U.S. PATENT DOCUMENTS

| | | | |
|---|---|---|---|
| 3,533,700 | 10/1970 | Alexander | 356/138 |
| 3,736,058 | 5/1973 | Iadarola | 356/172 |
| 3,817,624 | 6/1974 | Martin | 356/138 |
| 4,053,238 | 10/1977 | George et al. | 356/138 |

*Primary Examiner*—John K. Corbin
*Assistant Examiner*—R. A. Rosenberger
*Attorney, Agent, or Firm*—Woodard, Weikart, Emhardt & Naughton

[57] ABSTRACT

A platform laser beam generator support and alignment apparatus and method for using the same in construction measurement and alignment operations. The apparatus includes a triangular planar base, an elongated track composed of two rigid tubular members, the track being attached to the base perpendicular to the plane thereof and a platform bearingly attached to the track and reciprocable thereon, the platform including a portion extending parallel to the base and perpendicular to the track. A conventional laser beam generator is mounted to the parallel portion of the platform and a winch motor is detachably mounted to the upper end of the track and connected to the platform to allow the platform and generator to be reciprocated along the track. A guide hole in the base directly below the mounting bracket and generator allows the apparatus to be positioned directly above a reference point for construction such as the point of origin at the bottom of a construction hole from which a trench is to be dug and a pipe is to be laid. The generator can be rotated in a plane parallel to the base in order that the laser beam generated thereby can be aligned with a surface reference target distant from the apparatus when the platform and generator are moved to a position near the upper end of the track and extending above the surface of the ground. This surface alignment can then be maintained while the platform and generator are reciprocated along the track to the desired construction depth, such that the final alignment of the beam and generator after movement along the track is parallel to the initial alignment with the distant reference target.

32 Claims, 3 Drawing Figures

FIG. 1

PLATFORM LASER BEAM GENERATOR SUPPORT AND ALIGNMENT APPARATUS AND METHOD FOR USING SAME

BACKGROUND OF THE INVENTION

This invention relates to the field of trenching and pipe-laying operations and, particularly, to an improved method and support and alignment apparatus for aligning a laser beam emitted from a laser beam generator thereby improving the efficiency of such trenching and pipe-laying operations.

In recent years, a collimated light beam emitted from a laser beam generator has found a great many uses, several of which are with regard to surveying applications and, particularly, as a reference line for the predetermined guidance of equipment for such things as tunneling, hydraulic pipe pressing, irrigation work, alignment of railroad tracks and other applications. In such uses, the laser beam may be either on a level, or horizontal, plane or inclined at a predetermined angle or grade from the horizontal.

In this regard, particular benefit has been achieved by incorporating the use of such laser beam references into such construction operations as trenching and pipeline setting which require a high degree of accuracy. Conventionally, pipe laying involved the use of crude surveying instruments and a great deal of human effort and time in order to properly position the pipes. Surveying operations were often complex and the chances of error were numerous.

The use of a laser beam projected parallel to and at a certain distance above the desired invert line of a sewer or other pipeline eliminates many of the inaccuracies inherent in such conventional techniques. One problem that remains significant, however, is the need to accurately align the laser beam and generator with a surface reference target positioned distant from the generator after it has been properly positioned directly above the point of origin for the construction. The dilemma centers around the fact that while the laser generator must be positioned below the surface of the ground in a construction hole or trench in order to provide the needed reference line for the trenching and pipe-laying operation, the initial alignment with the distant reference target must be made from above the ground. To resolve this problem, several prior art methods and apparata have been developed to accomplish this above-ground alignment of the subsurface laser generator:

| Patent No. | Inventor | Issue Date |
|---|---|---|
| 3,279,070 | Blount et al. | 10/18/66 |
| 3,116,557 | Trice | 1/07/64 |
| 3,612,700 | Nelson | 10/12/71 |
| 3,879,132 | Myeress | 4/22/75 |
| 3,591,926 | Trice | 7/13/71 |
| 3,488,854 | Trice | 1/13/70 |

It can be generally said that each of the above references requires some kind of separate above-ground sighting device which must be first aligned with the distant reference target and then used in some manner to hopefully orient the subsurface laser beam and generator in like alignment. Specifically, the system disclosed by the Trice references requires the employment of a transit and numerous incremental micrometer adjustments to establish the beam upon the true line and grade, as set forth in column 4 of the patent specification in U.S. Pat. No. 3,116,557 above. Blount also requires the use of a citing device 11 which is mechanically slaved to the light beam source housing in order to establish the beam on proper line and grade. Myeress discloses a similar apparatus, except that a lateral set off portion is used to enable the light beam generator to be mounted inside a particular section of pipe.

Nelson, on the other hand, provides a slight deviation from the other references by first surveying by conventional techniques to establish a reference line perpendicular to the desired line of construction and then pendulously suspending the laser beam generator with vertical and horizontal adjustments in the particular construction hole.

Other prior art variations can be seen in U.S. Pat. No. 3,911,589, also issued to Myeress, and in U.S. Pat. No. 3,997,267, issued to Met. The former discloses merely an adjustable support base for a field measurement device including a vertical adjustable rod with a laser generator attached thereto for vertically orienting the laser in a particular construction hole. The latter discloses a complex automatic leveling device for providing a reference line for surveying, pipe laying and related purposes in which the leveled beam is deflected to the desired angle relative to the horizontal regardless of the orientation of the entire instrument at any given time.

Once properly aligned, regardless of the method and apparatus used, the laser beam provides a reference both for the laying of pipe and for the prior digging operation using such machinery as a trencher or a backhoe. In this regard, the Nelson reference above suggests the use of a backhoe in combination with an opaque or translucent surface to interrupt the laser beam along the reference line to maintain the backhoe operation on a true course. Walsh, U.S. Pat. No. 3,708,232, further discloses a particular passive optical readout device for locating and positioning objects such as a backhoe with respect to a fixed laser beam established in space as a parametric guide line. In the Walsh device, when the laser beam impinges on any one of the ends of the plurality of fiber optic bundles in the input array, the corresponding output or readout end of that same fiber optic bundle will glow brightly in the readout array thereby indicating to the operator of the trenching machine that he is following the correct course.

With the pipeline trench properly dug, the pipe-laying operation can begin with the laser beam again providing the reference line for the positioning and laying of the individual sections of pipe. In this regard, much work has also been done concerning the development of target devices which may be positioned along the path of the laser beam to assure that each individual pipe is laid in the proper orientation with respect to the beam. Each of the following reference patents discloses a specific type of target device suitable for such a use.

| Patent No. | Inventor | Issue Date |
|---|---|---|
| 3,907,435 | Roodvoets | 9/23/75 |
| 3,742,581 | Roodvoeis | 7/03/73 |
| 3,631,601 | McNulty | 1/04/72 |
| 3,599,336 | Walsh | 8/17/71 |
| 3,815,250 | Roodvoets et al. | 6/11/74 |

Further work, as shown in U.S. Pat. No. 3,827,155, issued to Menzel, and in U.S. Pat. No. 3,827,156, issued to Roodvoets et al., has even been done with regard to a method and apparatus for blowing air through the pipeline during the laser beam alignment process in order to prevent gases from building up within the pipeline and thereby distorting the laser beam from its original path.

It will be appreciated from the foregoing that although much work has been done in the area of laser beam alignment and support for use in trenching and pipe-laying operations, many problems exist with such prior art methods and apparata. Specifically, the use of separate above-ground telescopes or other visual alignment devices which are mechanically or otherwise joined to their respective below-surface laser beam generators incorporates the possibility of many inaccuracies resulting from the particular extended connecting apparata. In addition, the alignment methods of the prior art are often exceedingly difficult and require numerous adjustments in order to hopefully establish the beam upon a true line and grade. In this regard, it is well known by contractors that a reduction in the beam set up and alignment time would allow their crews to accomplish more work per day thereby greatly increasing the efficiency of the trenching and pipe-laying operations.

Therefore, there has remained a need for an improved laser beam generator alignment and support method and apparatus which will simplify the alignment operation and eliminate the many steps required by prior art devices while also providing an efficient and accurate means for aligning the laser beam upon the desired line and grade.

SUMMARY OF THE INVENTION

One embodiment of the present invention comprises a platform laser beam generator support and alignment apparatus for use in construction measurement and alignment, including a planar base, means for leveling the base when positioned on an unlevel slope, an elongated track having an upper and a lower end thereof, the track being rigid and straight with the lower end thereof attached to the base perpendicular to the plane thereof, a platform attached to the track and reciprocable thereon, means for mounting a laser beam generator to the platform with the generator being directed parallel to the planar base and for aligning the generator mounted thereto with an above-surface reference target distant therefrom, means for reciprocating the platform with generator mounted thereto along the elongated track between the upper and lower ends thereof, the means for reciprocating including means for maintaining the alignment of the generator while the platform is reciprocated, and means for positioning the base and platform with the laser beam generator mounted thereto directly above a below-surface reference point for construction, the track being sufficiently long that the platform with generator mounted thereto extends above surface when the base is so positioned and the platform is reciprocated to the upper end thereof.

The above embodiment of the present invention constitutes a significant advancement over the many prior art apparata as above discussed in that it requires no above-surface telescope, transit or other visual alignment device in order to properly align the laser beam emitted from the laser beam generator during a trenching, pipe-laying, or other construction operation. Instead, the above embodiment provides an elongated track sufficiently long that the platform and generator can extend above the surface of the ground when the base is positioned directly above a below-surface reference point for construction. The platform with generator mounted thereto can thus be moved along the track to its upper end and aligned with a given above-surface reference target distant therefrom, this alignment being then maintained while the platform is reciprocated along the track to any desired position, or depth, for construction purposes. By eliminating the prior art below-surface laser mount and separate above-surface citing device with the mechanical or other connections therebetween, the above embodiment has eliminated many of the prior art steps and adjustments along with much of the possibility of both mechanical and human error inherent with the prior art apparata.

In one mode of practicing the above embodiment, the track consists of two rigid tubular members parallel and spaced apart and secured by a number of cross braces, the track being about eleven feet in overall length including a detachable extension of about six feet in length. The base is triangular in configuration having leveling assemblies at each of its vertices with bracing rods and turnbuckles connected from the base to the elongated track. A winch motor is detachably mounted to the top of the track, or the extension thereof, and is operable to reciprocate the platform with a laser beam generator thereon between the lower and upper ends of the track. The generator is mounted to the platform by a mounting bracket and is rotatable in a plane parallel to the planar base in order to initially align the laser beam and generator with a distant above-surface reference target. This mode also constitutes a significant improvement over prior art apparata in that it provides a structurally sturdy platform support for using laser beam generators in trenching and pipe-laying operations which both provides a ready means for aligning the generator with a distant above-surface reference target and eliminates the need for any separate above-surface telescope or other visual alignment apparata common to the prior art.

A second embodiment of the present invention comprises a method for supporting and aligning a laser beam and generator in construction measurement and alignment, including the first steps of positioning the apparatus of the above embodiment with a laser beam generator mounted thereto directly above a below-surface reference point for construction and leveling the base after it is positioned. Next, the platform with the generator thereon is moved along the track in the direction of the upper end thereof, the moving being a sufficient distance that the generator may be directly aligned with an above-surface reference target distant therefrom. The generator is then actuated such that a continuous laser beam is projected therefrom and the beam is aligned with the distant reference target. The platform and aligned beam and generator are then moved along the track in the direction of the lower end thereof to a construction depth while maintaining the above-surface alignment of the laser beam and generator both after the aligning and during and after the moving.

This second embodiment of the present invention constitutes a significant improvement over prior art methods for supporting and aligning laser beam generators in trenching, pipe-laying and other construction operations. It requires no above-surface aligning of a separate telescope or other visual alignment apparatus and eliminates both the subsequent orientation of the below-surface laser generator and the many other adjusting steps required with prior art methods. By so doing, the possibility of both mechanical and human error being read into the alignment is greatly diminished because of the reduced number of steps required to obtain proper alignment.

In one mode of practicing the above second embodiment, the positioning of the apparatus is in a construction hole, the reference point for construction being the point of origin at the bottom of the hole from which a pipe is to be laid with the construction depth being the depth at which a trench is to be dug with the pipe to be laid therein. The maintaining step is also to the extent that the below-surface alignment of the laser beam and generator after moving the platform to the construction depth is parallel to the initial above-surface alignment with the distant reference target. As above, this mode of practicing the second embodiment constitutes a significant improvement over prior art methods for using a laser beam as a reference line during trenching and pipe-laying operations.

A third embodiment of the present invention comprises an apparatus and method for supporting and aligning an energy beam and its generator in construction measurement and alignment. The apparatus includes a base, an elongated track having an upper and a lower end thereof, said track being rigid and straight with the lower end attached to said base, means for establishing the track in a vertical position when the base is positioned on an unlevel slope, support means attached to the track and reciprocable thereon, means for mounting a beam generator to the support means and for aligning the generator mounted thereto to direct its beam to an above-surface reference target distant therefrom, means for reciprocating the support means with generator mounted thereto along the elongated track between the upper and lower ends thereof, the means for reciprocating including means for maintaining the alignment of the beam while the support means is reciprocated, and means for positioning the base and the support means with the beam generator mounted thereto directly above a reference point for construction, the track being sufficiently long that the support means with the generator mounted thereto extends above surface when the base is so positioned and the support means is reciprocated to the upper end thereof. The method includes the steps of positioning the above apparatus with a beam generator mounted thereto directly above a reference point for construction, establishing a vertical attitude of the track after said positioning, moving the support means with the generator mounted thereto along the track in the direction of the upper end thereof, the moving being a sufficient distance that the generator beam is directly aligned with an above-surface reference target distant therefrom, actuating the generator such that a beam is projected therefrom, aligning the beam with the distant reference target, moving the support means and aligned beam and generator along the track in the direction of the lower end thereof to a construction depth, and maintaining the above-surface alignment of the beam and generator after the aligning and during and after the moving to the construction depth.

As with the first and second embodiments, the apparatus and method of the third embodiment of the present invention constitute significant improvements over such prior art apparata and methods. By providing and establishing a vertical track of sufficient length directly above a reference point for construction, no separate above-surface visual alignment apparatus is needed and no separate two-phase aligning operation is required to properly orient the reference beam.

One object of the present invention is to provide an improved apparatus and method for supporting and aligning a laser beam generator for use in construction measurement and alignment operations.

A second object of the present invention is to provide an improved method and apparatus for supporting and aligning a laser beam and generator for use as a reference line in a trenching and pipe-laying operation.

A third object of the present invention is to provide an improved method and apparatus for supporting a laser beam and generator for use as a reference line in which the apparatus is positioned above the reference point for construction at the bottom of a construction hole, and the generator is reciprocated along a vertical track and aligned with an above-surface distant reference target and then lowered to the desired construction depth while maintaining the laser beam aligned parallel to its initial above-surface alignment.

Related objects and advantages of the present invention will be apparent from the following description.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

For the further purposes of the present application, including the claims attached hereto, the definitions of several terms may be initially set forth. The term "construction operation" may include not only an earth-moving operation in which a trencher or backhoe or other machine is used to make a trench or other excavation for the subsequent operation of making an improvement such as laying pipe, wire, or a building foundation, for example, but also the improvement operation itself. The "reference point for construction" is meant to indicate a point below the surface of the ground and from which the excavation operation or improvement operation, or both, is to proceed. The "construction depth" similarly refers to the particular depth below the surface at which the construction operation is to commence. The "reference target" refers to any type of target instrument, such as a surveying rod, which is positioned above ground and distant from the laser beam generator and apparatus along the path on which the pipe, wire, foundation or other improvement is to be made, the reference target being used to align the laser beam and generator above the surface of the ground before it is lowered to the construction depth in order to provide a reference line for both the trenching and pipe-laying operations. Lastly, any reference to "above surface" or "below surface" shall be meant to correspondingly indicate an object positioned or step performed either above or below the surface of the ground at the given construction site.

Figure 1:
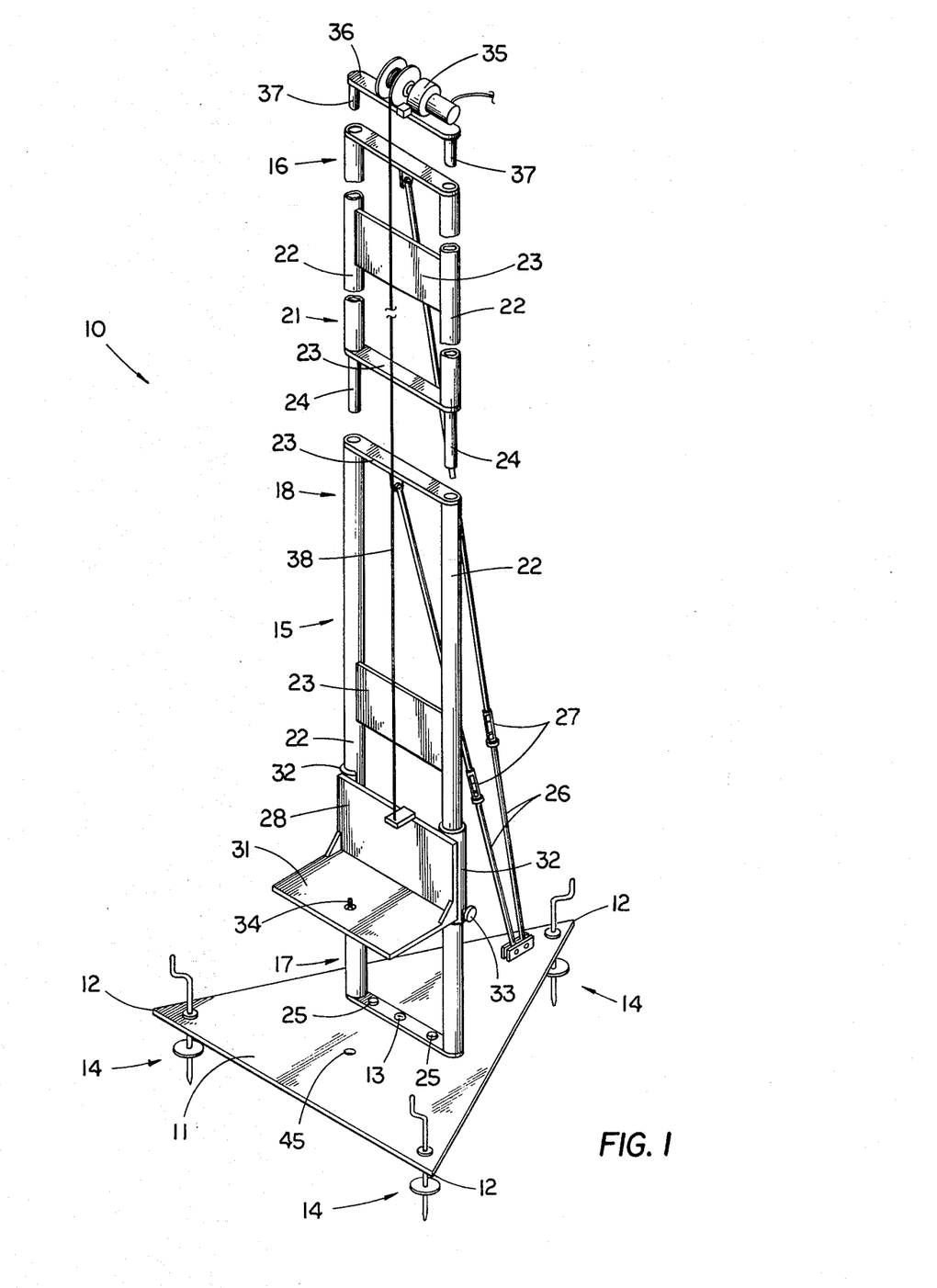
FIG. 1 is a perspective view of the platform laser beam generator support and alignment apparatus comprising one preferred embodiment of the present invention.

With the above definitions in mind, FIG. 1 depicts the preferred laser beam generator support and alignment apparatus 10 comprising the preferred embodiment of the present invention. Apparatus 10 consists of a planar base or frame 11 which has at least three vertices 12 and is composed of a material sufficiently strong to provide a structurally sturdy base upon which to mount the remaining structure which must be used to support a conventional laser beam generator during the construction operation.

Some kind of leveling means or mechanism must be incorporated into the base 11 in order to level apparatus 10 when it is positioned on an unlevel slope in a construction hole or trench during its use as further discussed hereinbelow. Although the particular configuration of base 11 may also vary substantially as long as its structural stability is maintained, in the preferred embodiment base 11 has a triangularly shaped planar configuration with a centrally positioned eye bubble 13 and three vertices 12 each having an adjustable screw, disc and pin assembly 14 which is adjustable to level the base when it is positioned on an unlevel slope.

An elongated track 15 having an upper and a lower end 16 and 17, respectively, is attached to base 11 perpendicular to the plane thereof. Although the configuration and structure of track 15 may also vary substantially according to many factors, not the least of which is design preference, the major consideration is that track 15 be rigid and straight and in a vertical attitude or position above the reference point for construction after base 11 has been properly positioned. In this regard, it is clearly within the contemplation and scope of the present invention that base 11 can be other than planar so long as other means are provided for establishing track 15 in a vertical attitude or position above the reference point for construction.

A second major factor in the construction of track 15 concerns its length, the limitation being that the track must be sufficiently long that the platform 28, with generator mounted thereto as further discussed hereinbelow, can extend above the surface of the ground when the base is positioned directly above a below-surface reference point for construction in a construction hole or trench. In general trenching and pipe-laying operations, this limitation requires that the track be about at least eleven to twelve feet in overall length in order that it will be suitable for use in the great majority of operations. However, as stated above, the overall length of track 15 can vary substantially given a particular use or operation.

In preferred embodiment 10, track 15 consists of a lower base portion 18 and one extension portion 21, the addition of further extensions being clearly within the contemplation of the present invention. Each portion 18 and 21 includes two elongated tubular members 22 which are parallel and spaced apart from each other and are secured by several cross braces 23 which are fixedly connected therebetween. Base portion 18 is about five feet in length, the significance of which will be discussed below. Extension 21 is about six feet in length and includes two inserts 24 which fit in the upper end of portion 18 to provide a rigid and straight track for supporting and aligning the laser beam and generator.

One modification incorporated into preferred embodiment 10 is that track 15 is detachably mounted to base 11 by means of two conventional bolts 25 and corresponding nuts (not shown) which securely attach the track perpendicular to the plane of base 11. This modification allows the base to be removed from the track and lowered into a particularly tight or restricted construction hole, such as manhole, in order to broaden the versatility and usefulness of apparatus 10. Two optional bracing rods 26 with turnbuckles 27 connected thereto also rigidly connect base 11 to both the portion 18 and extension 21 of track 15 thereby providing further structural support for the laser beam generator and apparatus when in use.

A platform or support means of some variety must also be provided with the present embodiment. In preferred apparatus 10, a platform 28 having at least a portion 31 thereof directed perpendicular to track 15 and parallel to planar base 11 is bearingly mounted to track 15 and reciprocable thereon. In this regard, two half-moon linear bushings 32 are employed in preferred apparatus 10 to bearingly mount platform 28 to track 15; however, various other conventional bearing mounts can be used equally well in the present invention. A further optional feature in preferred apparatus 10 is that locking assemblies 33 accompany each linear bushing 32 to enable the operator to lock the platform at any given point along track 15.

To practice the present embodiment, some means or type of mounting bracket or device must also accompany platform 28 for securely mounting a laser beam generator of the variety conventionally used in construction trenching and pipe-laying operations to the horizontal portion 31 of platform 28. A great variety of mounting devices are clearly within the contemplation of the present invention, but preferred apparatus 10 includes merely a wing bolt 34 extending through portion 31 of the platform and adapted to screwably fit in an appropriately sized and threaded housing (not shown in FIG. 1) in the underside of the laser beam generator. In this regard, conventional construction-type laser beam generators can range upwards of 100 pounds in weight and therefore a significant factor in constructing the platform 28 and selecting the particular mounting bracket is that they both be structurally capable of supporting and securing a laser beam generator of at least 100 pounds.

Furthermore, associated with platform 28 and apparatus 10 must also be some means for reciprocating the platform along track 15. One possible arrangement (not shown) may be to provide an elongated threaded rod passing through a threaded hole in the platform and driven by an electric motor located on base 11. By operating the reversible motor to rotate the threaded rod, the platform could be readily reciprocated along the track. However, in preferred apparatus 10 platform 28 is reciprocated by means of an electric winch motor 35 that is securely attached to a cross member 36 which has two inserts 37 appropriately sized to fit in the tubular ends of either base portion 18 or extension 21 of track 15. Winch motor 35 is reversible and variable speed and includes a length of line 38 sufficiently long and strong to support platform 28 with a laser beam generator mounted thereto as it is reciprocated between the upper and lower ends 16 and 17 of the track.

Figure 2:
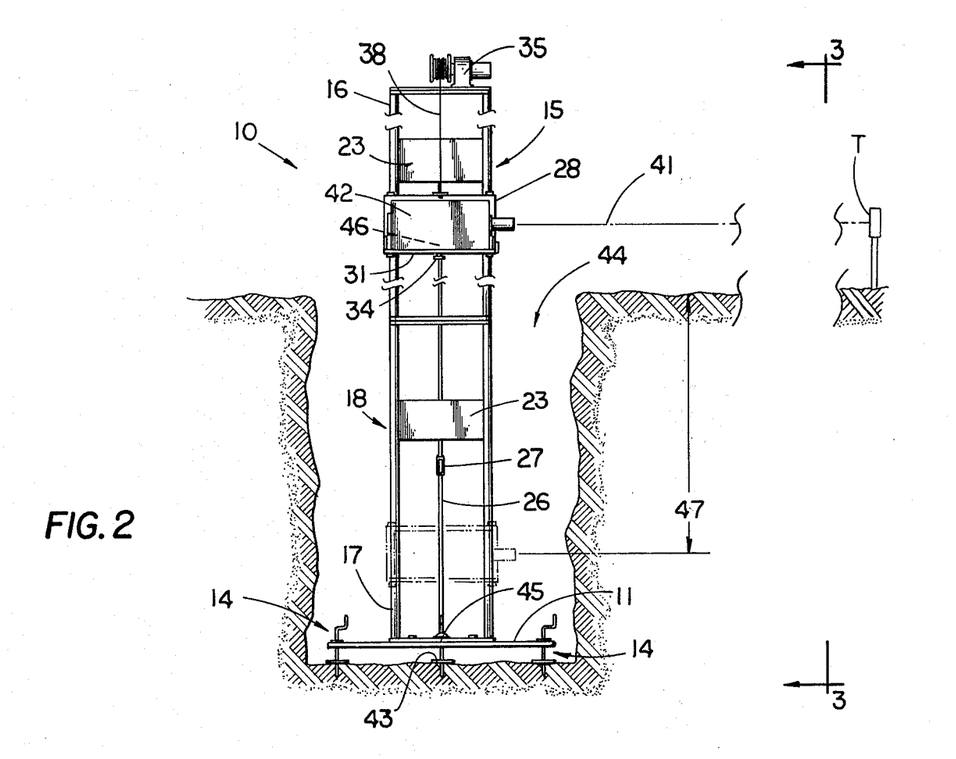
FIG. 2 is a side view with portions cut away of the support and alignment apparatus in FIG. 1 positioned in a construction hole.
Figure 3:
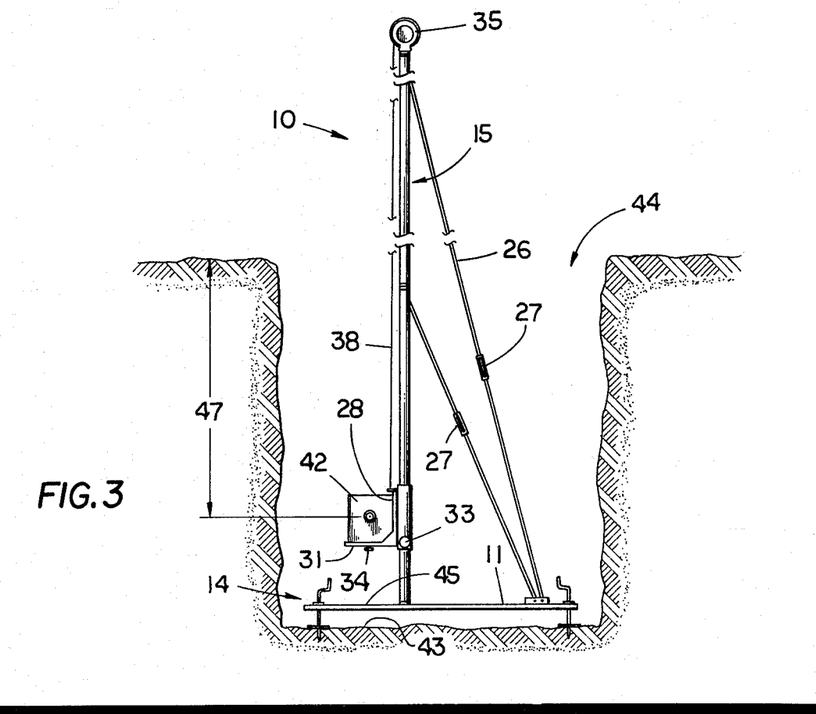
FIG. 3 is a front view with portions cut away of the support and alignment apparatus in position as shown in FIG. 2 taken along line 3—3.

The apparatus of the present embodiment must further include means for aligning the laser beam 41 and generator 42, depicted in FIGS. 2 and 3, with a particular distant above-surface reference target (not shown), once the platform and generator have been moved to an upper position along track 15 as shown by solid lines in FIG. 2. In the preferred embodiment, means are only provided for aligning the beam and generator by rotating the generator in a horizontal plane perpendicular to track 15. Such horizontal rotation is accomplished by merely loosening wing bolt 34 and then manually rotating the generator around this position until proper alignment is achieved. The wing bolt is then retightened to securely maintain the alignment of the beam and generator when it is later reciprocated downwardly along track 15.

It would be clearly possible, however, to substitute some variety of rotary table for the wing bolt 34 of the preferred embodiment, the table being calibrated in degrees and driven by an electric motor with a manual override mounted to base 11. The laser beam generator could then be automatically rotated to the desired position thus eliminating the need to climb a ladder to initially align the laser with the above-surface reference target. It is likewise clearly within the contemplation of the present invention that conventional means and apparatus may be incorporated into platform 28 and apparata 10 to permit the vertical rotation of laser beam 41 and generator 42 on the platform in order to incorporate a certain grade into the final alignment. In the same respect, it could also be convenient under given circumstances if the horizontal portion 31 of the platform with the laser generators attached thereto were hingedly mounted to the vertical portion of the platform and capable of being moved in a vertical arc of about 90° in either direction from its initial horizontal position. Such a modification is also within the contemplation of the present invention as herein described.

A further feature of the present embodiment important to its use as a support and alignment apparatus is that it includes means for positioning the apparatus 10 directly above a below-surface reference point for construction 43 at the bottom of a particular construction trench or hole 44, as seen in FIGS. 2 and 3. Specifically, a guide hole 45 is positioned in base 11 directly below wing bolt 34 in portion 31 of the platform. As above stated, wing bolt 34 securely seats in a threaded housing 46 in the underside of laser beam generator 42 at a point along the axis of the laser beam 41 emitted therefrom. By positioning the guide hole 45 directly above the particular below-surface reference point for construction, i.e., the point from which the trench is to be dug and the pipe is to be laid, subsequent alignment of the laser beam and generator with an above-surface reference target results in a properly aligned trench and pipeline after the construction operation is completed.

The exact dimensions and material composition of the apparatus of the above preferred embodiment may, of course, vary substantially according to a great many factors, the major consideration being to provide a structurally sturdy support for the laser beam generator that will permit and maintain the proper alignment of the laser beam to thereby provide an accurate reference line for the trenching and pipe-laying operation. However, in preferred apparatus 10, base 11 has the configuration of an equilateral triangle with edges between about three feet to about three and one-half feet in length and a thickness of about one inch, the base being cut from a rolled and hardened aluminum sheet. Both the base portion 18 and extension 21 of track 15 are constructed with aluminum tubes about three inches in outer diameter and rigidly aligned one foot apart by cross braces 23. The length of each portion of track 15, as above stated, is above five feet for base portion 18 and about six feet for extension 21. The advantage, as mentioned above, of constructing base portion 18 only about five feet in length is that with relatively shallow trenching and pipe-laying operations, extension 21 can be removed and winch 35 attached to base portion 18 thereby making it easy for the average workman to adjust and align the generator. The two-part track is also important because once the generator is aligned and locked in its proper position, the winch and extension 21 can be safely removed thereby lessening the possibility that the apparatus and generator will be bumped or knocked out of alignment.

For the purpose of describing and promoting an understanding of the preferred method of the present invention, reference will now be made specifically to FIGS. 2 and 3.

The first step in the preferred method is the positioning of apparatus 10 with a laser beam generator 42 mounted thereto directly above a below-surface reference point for construction 43 in a construction trench or hole 44. With the limited horizontal rotation and alignment capability of platform 28 of the preferred embodiment, the initial positioning of apparatus 10 should be such that the platform and generator are generally aligned in the direction of the above-surface reference target. This initial "rough" alignment is, of course, not required with other embodiments having broader, or wider-ranging, rotational and alignment capabilities.

Apparatus 10 is then leveled such that track 15 extends in a vertical direction by adjusting the individual assemblies 14 at each of the three vertices 12 of base 11 while continually monitoring eye bubble 13. The platform 28 with the generator mounted thereto is then moved along track 15 in the direction of the upper end 16 thereof a sufficient distance that the generator and beam may be directly aligned with an above-surface reference target ("T" FIG. 2) positioned distant from the apparatus. The particular distance the platform and generator must be moved, of course, depends upon their initial position and the specific construction depth, generally designated 47 in FIGS. 2 and 3.

The next step in the preferred method is to actuate the laser beam generator such that a continuous collimated light beam 41 is projected therefrom. The beam 41 and generator 42 are then aligned with the distant above-surface reference target by loosening wing bolt 34 and horizontally rotating generator 42 on portion 31 of the platform. As above discussed, it is within the contemplation of the present invention that this aligning step could also include vertically adjusting or rotating the generator using conventional means to incorporate a grade level into the desired reference line.

The platform 28 and aligned beam 41 and generator 42 are then moved along track 15 in the direction of lower end 17 to the desired construction depth 47 at which the trench is to be dug and pipe is to be subsequently laid.

The remaining step in the preferred method is to maintain the above-surface alignment of the laser beam and generator after it has been initially aligned and both during and after the platform has been moved to the desired construction depth. In the preferred embodiment, this is accomplished by providing a rigid and straight track 15 and by securely tightening wing bolt 34 after laser beam 41 and generator 42 have been properly aligned with the distant reference target. By thus providing a structurally sturdy support and alignment apparatus and by positioning such apparatus directly above the below-surface reference point for construction, the below-surface alignment of the laser beam and generator after the platform has been moved to the construction depth 47 is parallel to the initial above-surface alignment thereby providing an accurate reference line for both the trenching and pipe-laying operations.

In the preferred method of the present invention, as above described, the two moving steps in which the platform and generator are reciprocated along track 15 are accomplished by actuating the reversible electric winch motor 35 connected to the platform by line 38. An additional step also followed is to lock the platform in position by means of locking assemblies 33 both during the alignment step and after the platform has been moved to the construction depth. By so locking the platform, the vibrations resulting from the trenching and pipe-laying operations will not be able to jar or shake the apparatus sufficient to cause the platform to further move along track 15.

In practicing the present invention, the above-described preferred apparatus and method are first used and followed to establish laser beam 41 as an accurate reference line by which the construction operation may be performed. At that point, a backhoe or trencher (not shown) can begin digging the trench 44 using any variety of target device to interrupt the beam 41 and thereby guide the digging operation. After a sufficient distance of trench has been dug, and while the trenching operation continues its normal progress, the pipe-laying operation is begun also using the aligned laser beam 41 as a reference line. In this regard, any conventional type of target device can be used in combination with the present invention in order to properly and accurately lay the pipe along a line directly to the above-surface reference target.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. A platform laser beam generator support and alignment apparatus for use in construction measurement and alignment, comprising:
   (a) a planar base;
   (b) means for leveling said base when positioned on an unlevel slope;
   (c) an elongated track having an upper and a lower end thereof, said track being rigid and straight with the lower end attached to said base perpendicular to the plane thereof;
   (d) a platform attached to said track and reciprocable thereon;
   (e) means for mounting a laser beam generator to said platform with the generator being directed parallel to said planar base and for aligning the generator mounted thereto with an above-surface reference target distant therefrom;
   (f) means for reciprocating said platform with generator mounted thereto along said elongated track between the upper and lower ends thereof, said means for reciprocating including means for maintaining the alignment of the generator while said platform is reciprocated; and
   (g) means for positioning said base and said platform with the laser beam generator mounted thereto directly above a below-surface reference point for construction, said track being sufficiently long that said platform with generator mounted thereto extends above surface when said base is so positioned and said platform is reciprocated to the upper end thereof.

2. The apparatus in claim 1 in which said means for maintaining is to the extent that the alignment of the generator after said platform is reciprocated to the construction depth is parallel to the initial above-surface alignment thereof.

3. The apparatus in claim 2 in which said means for positioning includes a guide hole in said base, the below-surface reference point for construction being the point of origin at the bottom of a construction hole from which a pipe is to be laid, the construction depth being the depth at which a trench is to be dug with the pipe to be laid therein.

4. The apparatus in claim 3 in which at least a portion of said platform extends parallel to said planar base and perpendicular to said track, said means for mounting the laser beam generator including a mounting bracket in the parallel portion of said platform directly above said guide hole in said base, said bracket being adapted to mount to the generator at a point along the laser beam axis thereof.

5. The apparatus in claim 4 in which said means for aligning includes means for rotating the generator about said mounting bracket and in a plane parallel to said base.

6. The apparatus in claim 1 in which said track is two rigid tubular members parallel and spaced apart and secured by a plurality of cross braces fixedly connected therebetween.

7. The apparatus in claim 6 in which said track is about twelve feet in length.

8. The apparatus in claim 6 additionally comprising a detachable extension for said track, said track being about five feet in length and said extension thereof being about six feet in length.

9. The apparatus in claim 6 in which said track is detachable from said base.

10. The apparatus in claim 6 in which said means for reciprocating comprises:
    (a) a winch motor detachably mounted to the upper end of said track and including a line secured to said platform, said line being sufficiently long and sufficiently strong to support said platform with a laser beam generator mounted thereto while said platform is reciprocated along said track; and
    (b) means for operating said winch motor to reciprocate said platform along said track responsive thereto.

11. The apparatus in claim 10 additionally comprising means for locking said platform with the generator mounted thereto at a point along said track.

12. The apparatus in claim 10 in which said means for maintaining is to the extent that the alignment of the generator after said platform is reciprocated to the construction depth is parallel to the initial above-surface alignment thereof.

13. The apparatus in claim 10 in which said means for positioning includes a guide hole in said base, the below-surface reference point for construction being the point of origin at the bottom of a construction hole from which a pipe is to be laid, the construction depth being the depth at which a trench is to be dug with the pipe to be laid therein.

14. The apparatus in claim 13 in which said base is triangular in configuration and includes three vertices, said means for leveling including a bubble device attached to said base adjacent the lower end of said track and an adjustable screw, disc and pin assembly at each of said three vertices on said base.

15. The apparatus in claim 14 in which at least a portion of said platform extends parallel to said planar base and perpendicular to said track, said means for mounting the laser beam generator including a mounting bracket in the parallel portion of said platform directly above said guide hole in said base, said bracket being adapted to mount to the generator at a point along the laser beam axis thereof.

16. The apparatus in claim 15 in which said means for aligning includes means for rotating the generator about said mounting bracket and in a plane parallel to said base.

17. The apparatus in claim 16 in which said track is detachable from said base.

18. The apparatus in claim 17 additionally comprising a detachable extension for said track, said track being about five feet in length and said extension thereof being about six feet in length.

19. The apparatus in claim 18 additionally comprising a plurality of bracing rods with turnbuckles connected thereto, said bracing rods rigidly connecting and structurally supporting said base and said track and said extension thereof.

20. A method for supporting and aligning a laser beam and generator in construction measurement and alignment, comprising the steps of:
 (a) positioning the apparatus in claim 1 with a laser beam generator mounted thereto directly above a below-surface reference point for construction;
 (b) leveling the base after said positioning;
 (c) moving the platform with the generator mounted thereto along the track in the direction of the upper end thereof, said moving being a sufficient distance that the generator may be directly aligned with an above-surface reference target distant therefrom;
 (d) actuating the generator such that a continuous laser beam is projected therefrom;
 (e) aligning the beam with the distant reference target;
 (f) moving the platform and aligned beam and generator along the track in the direction of the lower end thereof to a construction depth; and
 (g) maintaining the above-surface alignment of the laser beam and generator after said aligning and during and after said moving to the construction depth.

21. The method in claim 20 in which said positioning is in a construction hole, the reference point for construction being the point of origin at the bottom of the hole from which a pipe is to be laid, the construction depth being the depth at which a trench is to be dug with the pipe to be laid therein.

22. The method in claim 20 additionally comprising performing the construction operation after said moving to the construction depth and during said maintaining.

23. The method in claim 22 in which the construction operation is the digging of a trench and laying of pipe therein from the reference point for construction and at the construction depth.

24. The method in claim 20 in which said maintaining is to the extent that the below-surface alignment of the laser beam and generator after said moving to the construction depth is parallel to the initial above-surface alignment thereof.

25. The method in claim 24 in which said aligning includes rotating the generator in a plane parallel to the base and directly above the reference point for construction.

26. The method in claim 25 in which said moving in the direction of both the upper and lower ends of the track includes actuating a winch motor detachably mounted to the upper end of the track, the winch motor including a line secured to the platform, the line being sufficiently long and sufficiently strong to support the platform and generator while the platform is moved along the track.

27. The method in claim 26 in which said positioning is in a construction hole, the reference point for construction being the point of origin at the bottom of the hole from which a pipe is to be laid, the construction depth being the depth at which a trench is to be dug with the pipe to be laid therein.

28. The method in claim 27 additionally comprising locking the platform with the generator mounted thereto along the track after said moving in the direction of both the upper and lower ends of the track.

29. The method in claim 28 in which said leveling includes centering a bubble device attached to the base by adjusting the individual adjustable screw, disc and pin assemblies at each of the vertices of the base.

30. The method in claim 29 in which said positioning is such that the platform and generator are generally aligned in the direction of the above-surface reference target.

31. An energy beam generator support and alignment apparatus for use in construction measurement and alignment, comprising:
 (a) a base;
 (b) an elongated track having an upper and a lower end thereof, said track being rigid and straight with the lower end attached to said base;
 (c) means for establishing said track in a vertical position when said base is positioned on an unlevel slope;
 (d) support means attached to said track and reciprocable thereon;
 (e) means for mounting a beam generator to said support means and for aligning the generator mounted thereto to direct its beam to an above-surface reference target distant therefrom;
 (f) means for reciprocating said support means with generator mounted thereto along said elongated track between the upper and lower ends thereof, said means for reciprocating including means for maintaining the alignment of the beam while said support means is reciprocated; and
 (g) means for positioning said base and said support means with the beam generator mounted thereto directly above a reference point for construction, said track being sufficiently long that said support means with generator mounted thereto extends above surface when said base is so positioned and said support means is reciprocated to the upper end thereof.

32. A method for supporting and aligning an energy beam and its generator in construction measurement and alignment, comprising the steps of:
(a) positioning the apparatus in claim 31 with a beam generator mounted thereto directly above a reference point for construction;
(b) establishing a vertical attitude of the track after said positioning;
(c) moving the support means with the generator mounted thereto along the track in the direction of the upper end thereof, said moving being a sufficient distance that the generator beam is directly aligned with an above-surface reference target distant therefrom;
(d) actuating the generator such that a beam is projected therefrom;
(e) aligning the beam with the distant reference target;
(f) moving the support means and aligned beam and generator along the track in the direction of the lower end thereof to a construction depth; and
(g) maintaining the above-surface alignment of the beam and generator after said aligning and during and after said moving to the construction depth.

* * * * *